(12) United States Patent
Clingman

(10) Patent No.: US 6,894,460 B2
(45) Date of Patent: May 17, 2005

(54) HIGH EFFICIENCY PASSIVE PIEZO ENERGY HARVESTING APPARATUS

(75) Inventor: Dan J. Clingman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/339,547

(22) Filed: Jan. 9, 2003

(65) Prior Publication Data

US 2004/0135554 A1 Jul. 15, 2004

(51) Int. Cl.[7] .............................................. H01M 10/46
(52) U.S. Cl. ...................................... 320/166; 310/311
(58) Field of Search ................................. 320/103, 116, 320/127, 135, 166, 167; 310/311, 316.03, 319

(56) References Cited

U.S. PATENT DOCUMENTS

| | | | |
|---|---|---|---|
| 3,336,529 A | | 8/1967 | Tygart |
| 3,456,134 A | | 7/1969 | Ko |
| 3,457,463 A | | 7/1969 | Balamuth |
| 3,466,473 A | | 9/1969 | Rhoten |
| 3,624,451 A | | 11/1971 | Gauld |
| 4,467,236 A | | 8/1984 | Kolm et al. |
| 4,947,074 A | * | 8/1990 | Suzuki ................... 310/316.03 |
| 5,126,589 A | * | 6/1992 | Renger ........................ 327/111 |
| 5,208,505 A | | 5/1993 | Mitsuyasu |
| 5,703,474 A | | 12/1997 | Smalser |
| 5,801,475 A | | 9/1998 | Kimura |
| 5,969,954 A | * | 10/1999 | Zaitsu .......................... 363/16 |
| 6,147,433 A | | 11/2000 | Reineke et al. |
| 6,382,026 B1 | | 5/2002 | Tajika et al. |
| 6,530,276 B2 | | 3/2003 | Tajika et al. |

FOREIGN PATENT DOCUMENTS

| | | |
|---|---|---|
| JP | 07245970 | 9/1995 |
| WO | WO 00/74224 | 12/2000 |
| WO | WO 01/20760 A1 | 3/2001 |
| WO | WO 01/95469 | 12/2001 |

OTHER PUBLICATIONS

PCT International Search Report, Application No. PCT/US2004/000411 (11 pgs.), Jul. 2004.
PCT International Search Report, dated Aug. 5, 2004, 5 pgs.
XP–002135857, R. J. Wilfinger and R. A. Carballo, "Speech Coder Utilizing SemiConductor Cantilevers", Jan. 1968 (1 pg).
XP–002288947, Muneo Harada et al., "Fish–bone structured acoustic sensor toward silicon cochlear systems", Sep. 1998 (5 pgs).

* cited by examiner

Primary Examiner—Edward H. Tso
(74) Attorney, Agent, or Firm—Harness Dickey & Pierce P.L.C.

(57) ABSTRACT

A circuit passively discharges energy from a piezoelectric device and stores the energy in a power storage element. The circuit has two parallel flow paths each including a diode set and an inductor electrically connected to opposite sides of a piezoelectric device. A power storage element is connected to both inductors. The diode sets are alternately forward biased, and energy from the piezoelectric device discharges through the inductor(s). A portion of the energy is stored in the inductor(s) and the remaining portion is stored in the power storage element. The benefits achieved include passive switching between the parallel circuit paths through diodes in place of traditional switches, and the additional energy stored by the inductors which is also transferred to the power storage element. Passive switching conserves additional energy.

20 Claims, 5 Drawing Sheets

HIGH EFFICIENCY PASSIVE PIEZO ENERGY HARVESTING APPARATUS

FIELD OF THE INVENTION

The present invention relates in general to piezo device energy harvesting and more specifically to a method and apparatus to discharge and store electrical energy from piezoelectric devices.

BACKGROUND OF THE INVENTION

Piezoelectric devices are known which can be used as a power source and are particularly useful for remote applications where other power sources such as batteries or generators are impractical. In common applications, the energy of the piezoelectric device is harvested and stored in an energy storage element. Piezoelectric devices internally produce energy as the device vibrates. The energy available from a piezoelectric device increases as the square of the voltage. The relationship is that the energy (E) stored in a device equals ½ $CV^2$, C being the capacitance of the device and V being the voltage. Although the energy of the device increases as a squared function, the charge available goes up linearly.

Common circuits to discharge piezoelectric devices use capacitors as the power storage element. The disadvantage of discharging a piezoelectric device directly to a capacitor is that the energy generated by the piezoelectric device is not fully utilized. To improve the transfer and storage of a piezoelectric device's energy, inductors (e.g., coils) are disposed in the flow path to the energy storage element (e.g., the capacitor). The inductors store a portion of the energy discharged from the piezoelectric device and this energy can be harvested once the piezoelectric charge dissipates.

Piezoelectric devices generally produce energy at high frequency and low amperage. The intent of the energy storage elements, therefore, is to store this energy in a device capable of providing the higher amperage necessary to operate other devices (e.g., sensor systems and remote devices) which are an increasing area of use for piezoelectric devices. Common piezoelectric device energy harvesting circuits include diodes and inductors arranged in parallel circuit paths across the terminals of the piezoelectric device. Switches are commonly disposed in each parallel circuit path which are timed to match the driving frequency inducing piezoelectric device energy generation. The disadvantage of using switches is that each switch and its controlling circuitry dissipates a portion of the already low charge of the piezoelectric device before it reaches the energy storage element.

It is therefore desirable to provide a circuit for discharging piezoelectric devices which eliminates the switches such that the energy normally lost to operate the switches is retained and saved by the energy storage element. It is also desirable to provide a passive piezoelectric energy harvesting circuit to reduce circuit cost and decrease circuit complexity.

SUMMARY OF THE INVENTION

In a preferred embodiment of the present invention, a circuit passively discharges energy from a piezoelectric device and stores the energy in a power storage element. The circuit has two flow paths arranged in parallel about the terminals of the piezoelectric device. Each flow path includes a plurality of diodes and an inductor electrically connected to one terminal of the piezoelectric device. A power storage element is connected at a discharge end of both inductors. Selected diodes are alternately forward biased, and an energy from the piezoelectric device discharges through the inductor(s). A portion of the energy is stored in the inductor(s) as current flows through the inductor(s) and the remaining portion charges the power storage element.

In an exemplary operating condition, the voltage at a first terminal of the piezoelectric device is positive. A positive voltage across the first inductor forward biases select diodes to close inducing current flow across the first inductor into the energy storage element. The positive voltage at the first terminal of the piezoelectric device decreases as current flows across the first inductor into the power storage element. As the voltage across the first inductor changes to a negative voltage, the current with respect to time (dI/dT) decreases across the first inductor and selected diodes in this flow path are re-biased which opens the flow path to the first terminal of the piezoelectric device and closes a flow path between the first inductor and the power storage element. The closed flow path discharges the energy temporarily stored in the first inductor to the power storage element.

As the voltage at the first terminal of the piezoelectric device changes to a negative voltage and the voltage at the second terminal of the piezoelectric device changes to a positive voltage, a positive voltage across the second inductor forward biases select diodes to close a flow path inducing current flow across the second inductor into the energy storage element. The positive voltage at the second terminal of the piezoelectric device gradually decreases as current flows across the second inductor into the power storage element. As the voltage across the second inductor changes to a negative voltage, the current with respect to time (dI/dT) decreases across the second inductor and selected diodes in this flow path are re-biased which opens the flow path to the second terminal of the piezoelectric device and closes a flow path between the second inductor and the power storage element. This closed flow path discharges the energy temporarily stored in the second inductor to the power storage element.

In a preferred embodiment of the present invention, a voltage regulator is included adjacent to the power storage element. The diodes of the present invention are preferably nano-second time response diodes to follow the operating frequency of the piezoelectric device. The diodes of the present invention provide a passive switching operation, advantageously using the switching capability and low power consumption of diodes to reduce the power loss of the circuit and maximize the energy discharged from the piezoelectric device and stored in the power storage element.

In a preferred embodiment, six diodes are used in the circuit of the present invention. Each of the six diodes are forward or reverse biased to open or close a flow path between the piezoelectric device, each of the inductors, and the energy storage element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
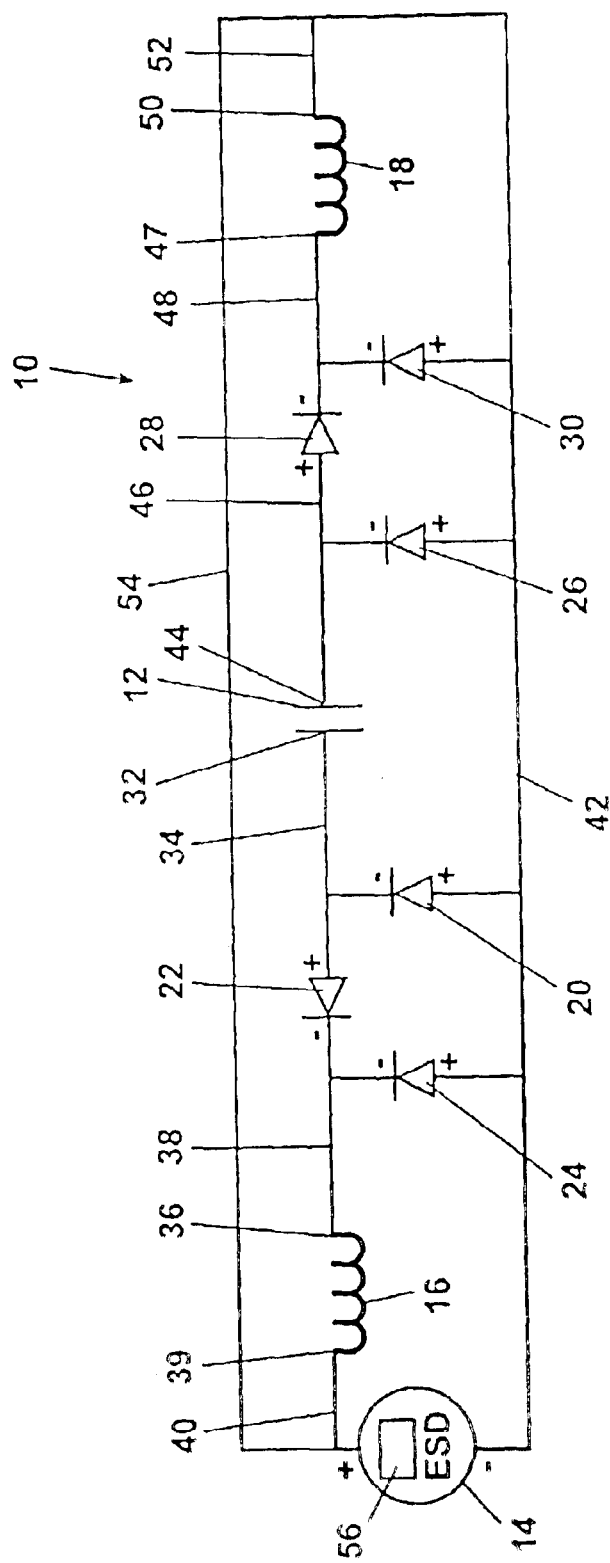
FIG. 1 is a schematic diagram of a preferred embodiment of the present invention, having a piezoelectric element, a pair of inductors, a plurality of diodes, and an energy storage element.

Referring to FIG. 1, a passive circuit 10 in accordance with a preferred embodiment of the present invention is shown. The circuit 10 is used for discharging the energy stored in a piezoelectric device 12 to an energy storage element 14. The passive circuit 10 includes a first inductor 16 and a second inductor 18. The passive circuit 10 also includes a plurality of diodes, and in the embodiment shown six diodes: a first diode 20, a second diode 22, a third diode 24, a fourth diode 26, a fifth diode 28 and a sixth diode 30.

The diodes are disposed in the passive circuit 10 such that a cathode terminal of the first diode 20 is connected to a first terminal 32 of device 12 via a connector 34. An anode terminal of the second diode 22 is also connected to the connector 34 and thereby to the first terminal 32. The cathode terminal of the second diode 22 is connected to a first terminal 36 of the first inductor 16 via a connector 38. A second terminal 39 of the first inductor 16 is connected to the positive terminal of the energy storage element 14 via a first inductor discharge path 40. An anode terminal of the first diode 20 is connected to the negative terminal of the energy storage element 14 via a common connector 42. A cathode terminal of the third diode 24 is connected to the connector 38 between the second diode 22 and the first terminal 36 of the first inductor 16. An anode terminal of the third diode 24 is connected to the common connector 42.

In a parallel circuit path, a cathode terminal of the fourth diode 26 is connected to a second terminal 44 of the piezoelectric device 12 via a connector 46. An anode terminal of the fifth diode 28 is also connected to the connector 46 and thereby to the second terminal 44. A cathode terminal of the fifth diode 28 is connected to a first terminal 47 of the second inductor 18 via a connector 48. A second terminal 50 of the second inductor 18 is connected to the positive terminal of the energy storage element 14 via a second inductor discharge path 52 and a connector 54 respectively. The connector 54 and the first inductor discharge path 40 form a common connection between the first inductor 16, the second inductor 18 and the positive terminal of the energy storage element 14. The second inductor discharge path 52 is also in parallel connected to the common connector 42 and thereby to the negative terminal of the energy storage element 14.

An anode terminal of the fourth diode 26 is connected to the common connector 42 and thereby to the negative terminal of the energy storage element 14. The sixth diode 30 has a cathode terminal connected to the connector 48 between the fifth diode 28 cathode terminal and the first terminal 47 of the second inductor 18. An anode terminal of the sixth diode 30 is connected to the common connector 42 and thereby to the negative terminal of the energy storage element 14. In another preferred embodiment of the present invention, a voltage regulator is disposed in the passive circuit 10 adjacent to the energy storage element 14.

Figure 2:
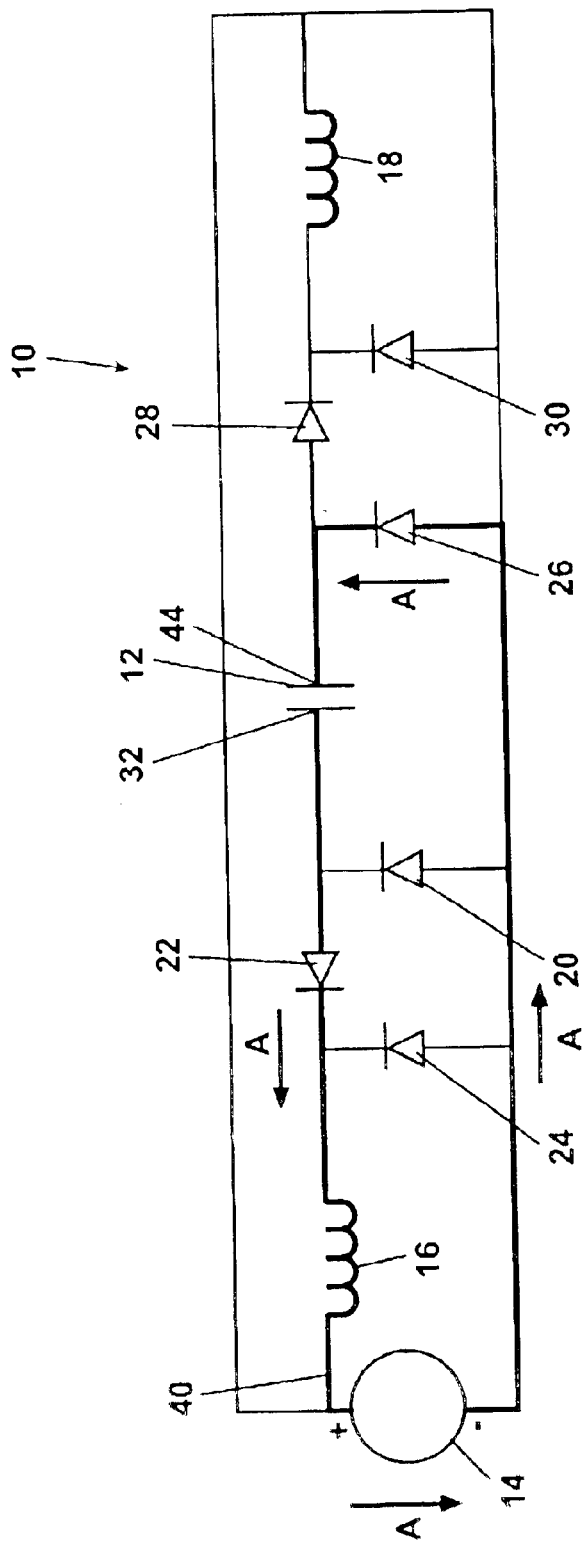
FIG. 2 is a simplified view of the diagram of FIG. 1 showing a current flow path from a first terminal of the piezoelectric element through a first inductor and discharging into the energy storage element.

Referring now to FIG. 2, an exemplary flow path for discharging energy of the piezoelectric device 12 from the first terminal 32 to the energy storage element 14 is shown. A positive voltage is shown at the first terminal 32 and a negative voltage is shown at the second terminal 44. A positive voltage across the first inductor 16 forward biases the second diode 22 and the fourth diode 26. The first diode 20, the third diode 24, the fifth diode 28, and the sixth diode 30 are reverse biased. A flow path is therefore closed between the first terminal 32 and the energy storage element 14 as follows: current flows from the first terminal 32 via the forward biased second diode 22 into the first inductor 16, temporarily charging the first inductor 16 using a first portion of the energy of the piezoelectric device 12. From the first inductor 16, current flows into the positive terminal of the energy storage element 14, storing a second portion of the energy of the piezoelectric device 12 in the energy storage element 14. The circuit path is completed from the negative terminal of the energy storage element 14 to the piezo second terminal 44 via the forward biased fourth diode 26. This current flow path is represented by the flow arrows A as shown.

Figure 3:
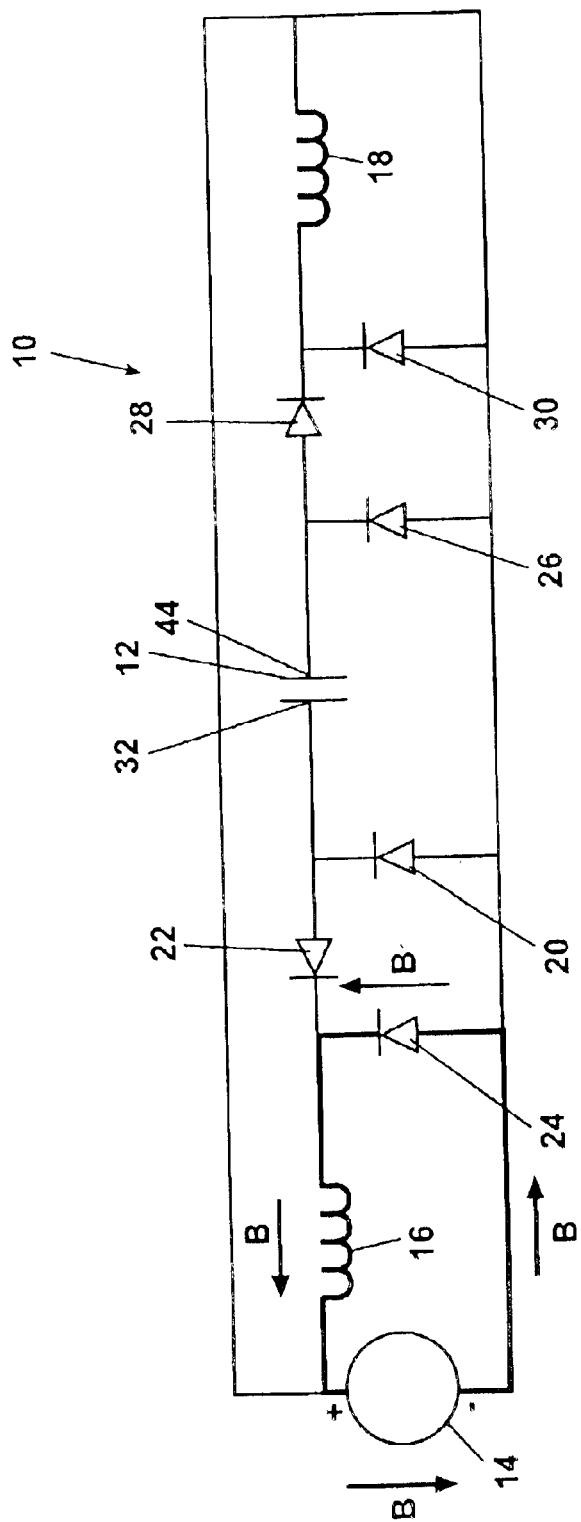
FIG. 3 is a simplified view of the diagram of FIG. 1 showing a current flow path to discharge the temporarily stored energy in the first inductor to the energy storage element, following a diode bias change in the circuit.

Referring to FIG. 3, the positively charged first terminal 32 gradually decreases in voltage as current flows to the first inductor 16 and the energy storage element 14 until the voltage of the energy storage element 14 equals or exceeds the voltage at the first terminal 32. A negative voltage across the first inductor 16 causes a reverse bias of both the second diode 22 and the fourth diode 26, and a forward bias of the third diode 24. This closes a flow path represented by the flow arrows B. The energy temporarily stored in the first inductor 16 is discharged by a current path from the first inductor 16 to the positive terminal of the energy storage element 14 and from the negative terminal of the energy storage element 14 through the now forward biased third diode 24. Current from the first inductor 16 continues to flow to the energy storage element 14 until the voltage of the energy storage element 14 equals or exceeds the voltage across the first inductor 16. Since the current flow from the first inductor 16 has a negatively changing $dI/dT$, the current flow rapidly decays to zero. In the flow path represented in FIG. 3, each of the first diode 20, the second diode 22, the fourth diode 26, the fifth diode 28, and the sixth diode 30 are reverse biased.

Figure 4:
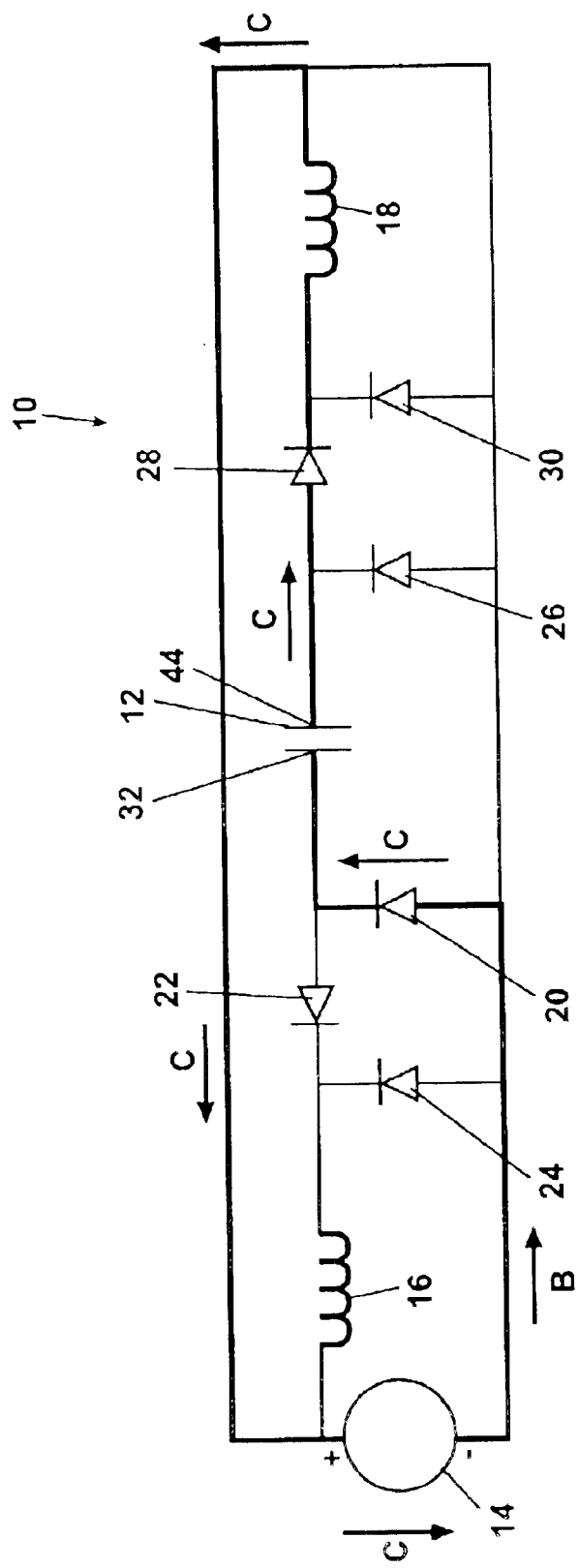
FIG. 4 is a diagram similar to FIG. 2 showing a current flow path to discharge the energy from the second terminal of the piezoelectric device through the second inductor into the energy storage element.

Referring to FIG. 4, an exemplary flow path for discharging energy of the piezoelectric device 12 from the second terminal 44 to the energy storage element 14 is shown. A positive voltage is shown at the second terminal 44 and a negative voltage is shown at the first terminal 32. A positive voltage across the second inductor 18 forward biases the fifth diode 28 and the first diode 20. The second diode 22, the third diode 24, the fourth diode 26, and the sixth diode 30 are reverse biased. A flow path is therefore closed between the second terminal 44 and the energy storage element 14 as follows: current flows from the second terminal 44 via the forward biased fifth diode 28 into the second inductor 18, temporarily charging the second inductor 18 using a first portion of the energy of the piezoelectric device 12. From the second inductor 18, current flows into the positive terminal of the energy storage element 14, storing a second portion of the energy of the piezoelectric device 12 in the energy storage element 14. The circuit path is completed from the negative terminal of the energy storage element 14 to the first terminal 32 via the forward biased first diode 20. This current flow path is represented by the flow arrows C.

Figure 5:
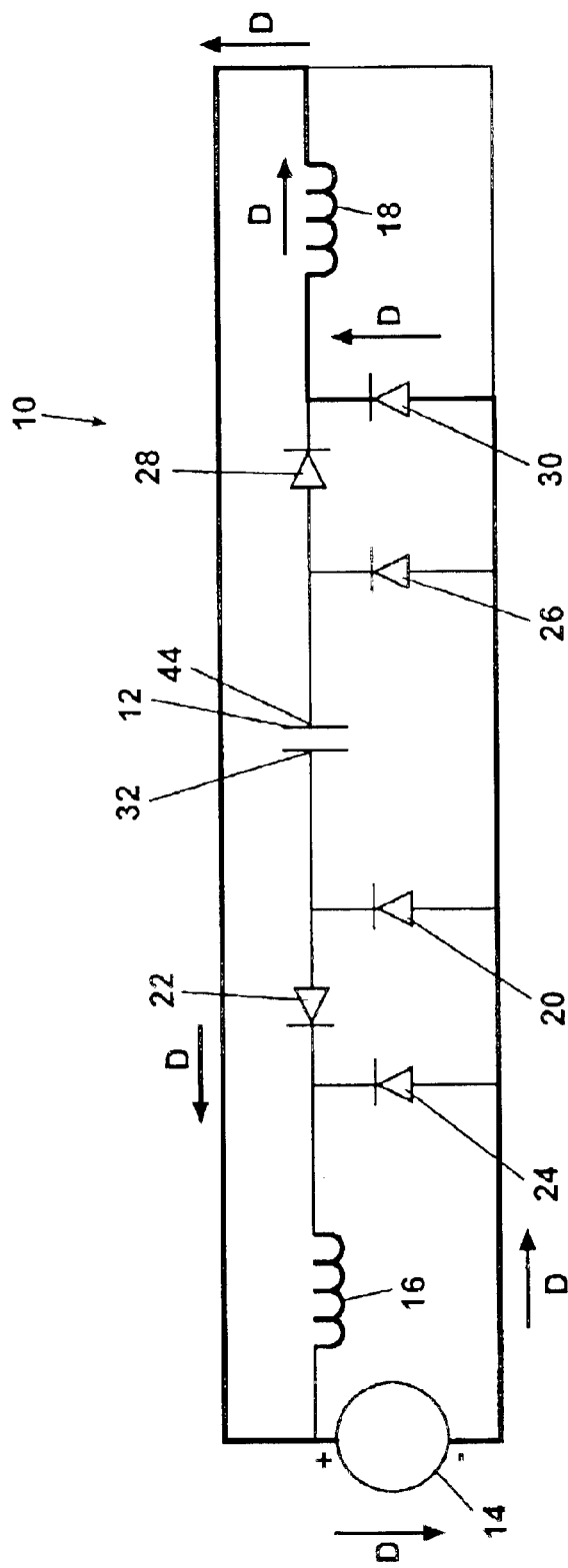
FIG. 5 is a diagram similar to FIG. 3 showing a current flow path to discharge the temporarily stored energy in the second inductor to the energy storage element, following a diode bias change in the circuit.

Referring to FIG. 5, the positively charged second terminal 44 gradually decreases in voltage as current flows to the second inductor 18 and the energy storage element 14 until the voltage of the energy storage element 14 equals or exceeds the voltage at the second terminal 44. A negative voltage across the second inductor 18 causes a reverse bias of both the fifth diode 28 and the first diode 20, and a forward bias of the sixth diode 30. This closes a flow path represented by the flow arrows D. The energy temporarily stored in the second inductor 18 is discharged by a current path from the second inductor 18 to the positive terminal of the energy storage element 14 and from the negative terminal of the energy storage element 14 through the now forward biased sixth diode 30. Current from the second inductor 18 continues to flow to the energy storage element 14 until the voltage of the energy storage element 14 equals or exceeds the voltage across the second inductor 18. Since the current flow from the second inductor 18 has a negatively changing dI/dT, the current flow rapidly decays to zero. In the flow path represented in FIG. 5, each of the first diode 20, the second diode 22, the third diode 24, the fourth diode 26, and the fifth diode 28 are reverse biased.

The passive circuit 10 of the present invention can be used for any operating frequency of the piezoelectric device 12, however at frequencies of operation below approximately 1 kHz, the inductance of the first and second inductors 16 and 18 respectively, will require inductors sized in the multiple farad range. The practicality of employing inductors of this size will determine the operating frequency cutoff the circuit designer selects to use a circuit of the present invention. At frequencies above approximately 10 kHz, the inductance of the first and second inductors 16 and 18, respectively, is reduced to approximately 0.02 farads or less.

The diodes of the present invention preferably comprise nano-second time response diodes and are preferably of the Schottky barrier diode technology. The diodes are selected to support the operation frequency of the piezoelectric device 12. As the frequency of the piezoelectric device 12 increases, the operating speed of the diodes increases.

The passive circuit 10 of the present invention provides several advantages. By using diodes in place of switches commonly used for the application of discharging piezoelectric devices, a passive circuit is created. Energy loss associated with operation of the switches is reduced through the use of the diodes 20–30. This energy is therefore retained and saved by the energy storage element. The circuit 10 of the present invention can be used over the frequency range of a piezoelectric device, having practical limits only depending on the size of the inductors and the capacitor used for the energy storage element.

A capacitor is commonly used as an energy storage element in discharging energy from a piezoelectric device for storage. The present invention is not limited to a capacitor for energy storage. Other storage devices can be used, including batteries. The passive circuit of the present invention can also be used with a variety of piezoelectric devices.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for passively discharging energy stored in a piezoelectric device, and for storing said energy of said piezoelectric device, comprising:
   disposing at least one inductor and an energy storage element in a circuit including said piezoelectric device;
   orienting a plurality of diodes in said circuit biasable to form a plurality of discharge flow paths within said circuit to discharge said energy from said piezoelectric device;
   forward biasing select ones of said diodes in said circuit;
   discharging said energy from said piezoelectric device in one of said flow paths formed by said selected ones of said forward biased diodes, through said inductor and said energy storage element;
   storing said energy in each of said inductor and said energy storage element;
   temporarily storing a first portion of said energy in said inductor;
   transferring a second portion of said energy to said energy storage element;
   changing a bias of at least one of said diodes; and
   discharging said first portion of said energy from said inductor to said energy storage element.

2. The method of claim 1, comprising dividing said circuit into a pair of parallel flow paths including a first flow path and a second flow path.

3. The method of claim 2, comprising connecting each of said parallel flow paths between a selected terminal of said piezoelectric device and said energy storage element.

4. The method of claim 3, further comprising:
   reducing a piezoelectric device charge at a first terminal of said piezoelectric device by current discharge through said first flow path;
   changing a bias of selected diodes in both said first flow path and said second flow path; and
   discharging a piezoelectric device charge at a second terminal of said piezoelectric device by current discharge through said second flow path.

5. A method for passively discharging a quantity of energy from a piezoelectric device using diodes biased to direct said energy in predefined flow paths, comprising the steps of:
   disposing a piezoelectric device having first and second terminals in a circuit;
   connecting a first one of a pair of inductors to said first terminal of said piezoelectric device, and a second one of said pair of inductors to said second terminal of said piezoelectric device;
   electrically linking a power storage element to a second terminal of both said first inductor and said second inductor;
   disposing a plurality of diodes between said piezoelectric device, said first and second inductors, and said power storage element; and
   biasing each of said diodes to form a plurality of flow paths operable to passively transfer said energy from said piezoelectric device to said power storage device.

6. The method of claim 5, comprising:
   forward biasing select ones of said diodes when a positive voltage exists at said first terminal of said piezoelectric device and a negative voltage exists at said second terminal of said piezoelectric device; and discharging a portion of said energy from said first terminal of said piezoelectric device through said first inductor to said power storage element.

7. The method of claim 6, comprising:

temporarily storing a portion of said energy in said first inductor;

forward biasing only one of said diodes when an energy storage element voltage exceeds said positive voltage at said first terminal; and discharging said portion of said energy in said first inductor to said power storage element in a flow path including said forward biased select one of said diodes.

8. The method of claim 5, comprising:

forward biasing select ones of said diodes when a positive voltage exists at said second terminal of said piezoelectric device and a negative voltage exists at said first terminal of said piezoelectric device; and discharging a portion of said energy at said second terminal of said piezoelectric device, through said second inductor to said power storage element.

9. The method of claim 8, comprising:

temporarily storing a portion of said energy in said second inductor;

forward biasing only one of said diodes when an energy storage element voltage exceeds said positive voltage at said second terminal; and discharging said portion of said energy in said second inductor to said power storage element in a flow path including said forward biased select one of said diodes.

10. The method of claim 5, comprising connecting a voltage regulator with said power storage element.

11. A circuit for passively discharging a piezoelectric device and storing an energy of said device, comprising:

a piezoelectric device having first and second terminals to discharge said energy;

a first inductor having a first terminal connected to said first terminal of said piezoelectric device;

a second inductor having a first terminal connected to said second terminal of said piezoelectric device;

a power storage element connected to a second terminal of both said first inductor and said second inductor; and a plurality of diodes disposed between said piezoelectric device, said first and second inductors, and said power storage element, each of said diodes selectively biased to passively transfer said stored energy from said piezoelectric device to said power storage element.

12. The circuit of claim 11, further comprising:

said diodes having both a forward biased condition and a reverse biased condition; and said piezoelectric device having an oppositely charged voltage at each of said first terminal and said second terminal, said oppositely charged voltage variable between a positive voltage and a negative voltage;

wherein said voltage at said first and second terminals biases said diodes to one of said forward biased condition and said reverse biased condition.

13. The circuit of claim 12, further comprising:

a first diode having a cathode terminal connected to a first terminal of said piezoelectric device and an anode terminal connected to a negative terminal of said power storage device;

a second diode having an anode terminal connected to said first terminal of said piezoelectric device and a cathode terminal connected to a first terminal of said first inductor;

a third diode having a cathode terminal connected to said cathode terminal of said second diode and an anode terminal connected to said positive terminal of said power storage element; and a fourth diode having a cathode terminal connected to a second terminal of said piezoelectric device and an anode terminal connected to said negative terminal of said power storage device;

a fifth diode having an anode terminal connected to said second terminal of said piezoelectric device and a cathode terminal connected to a first terminal of said second inductor; and a sixth diode having a cathode terminal connected to said cathode terminal of said fifth diode and an anode terminal connected to said positive terminal of said power storage element.

14. The circuit of claim 13, further comprising:

a first flow path having a positive voltage at said first terminal of said piezoelectric device and a negative voltage at said second terminal of said piezoelectric device, said second and said fourth diodes forward biased, and said first;third, fifth and sixth diodes reverse biased; and said first flow path including a discharge path from said first terminal of said piezoelectric device, through said first inductor to said power storage element.

15. The circuit of claim 14, further comprising:

an energy storage element voltage exceeding said positive voltage at said first terminal is operable to reverse bias said second diode and said fourth diode and forward bias said third diode to form a second flow path; and said second flow path includes said first inductor, said power storage element, and said third diode wherein a stored portion of said energy in said first inductor is discharged to said power storage element.

16. The circuit of claim 13, further comprising:

a third flow path having a positive voltage at said second terminal of said piezoelectric device and a negative voltage at said first terminal of said piezoelectric device, both said first diode, and said fifth diode forward biased, and said second, third, fourth and sixth diodes reverse biased; and said third flow path includes a discharge path from said second terminal of said piezoelectric device, through said second inductor to said power storage element.

17. The circuit of claim 16, further comprising:

an energy storage element voltage exceeding said positive voltage at said second terminal is operable to reverse bias both said first diode and said fifth diode and forward bias said sixth diode to form a fourth flow path; and said fourth flow path includes said second inductor, said power storage element, and said sixth diode wherein a stored portion of said energy in said second inductor is discharged to said power storage element.

18. The circuit of claim 11, wherein said power storage element comprises a capacitor.

19. The circuit of claim 11, further comprising a voltage regulator connected to said power storage element.

20. The circuit, of claim 11, wherein said diodes comprise approximately nanosecond time-response diodes.

* * * * *